(12) United States Patent
Tremblay et al.

(10) Patent No.: US 7,836,281 B1
(45) Date of Patent: *Nov. 16, 2010

(54) CONTINUING EXECUTION IN SCOUT MODE WHILE A MAIN THREAD RESUMES NORMAL EXECUTION

(75) Inventors: Marc Tremblay, Menlo Park, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/245,774

(22) Filed: Oct. 6, 2005

Related U.S. Application Data

(63) Continuation-in-part of application No. 10/686,061, filed on Oct. 14, 2003, now Pat. No. 7,114,060.

(51) Int. Cl.
*G06F 9/30* (2006.01)
*G06F 9/40* (2006.01)
*G06F 7/38* (2006.01)
*G06F 9/00* (2006.01)
*G06F 9/44* (2006.01)

(52) U.S. Cl. .................. 712/220; 712/207; 712/228; 712/229

(58) Field of Classification Search ................ 712/201, 712/228, 43, 229
See application file for complete search history.

(56) References Cited

U.S. PATENT DOCUMENTS

| | | | | |
|---|---|---|---|---|
| 5,920,710 A | * | 7/1999 | Tan et al. | 712/216 |
| 5,933,627 A | * | 8/1999 | Parady | 712/228 |
| 6,880,073 B2 | * | 4/2005 | Arimilli et al. | 712/245 |
| 7,444,544 B2 | * | 10/2008 | Bose et al. | 714/10 |
| 2001/0042187 A1 | * | 11/2001 | Tremblay | 712/2 |
| 2002/0144083 A1 | * | 10/2002 | Wang et al. | 712/23 |
| 2006/0136915 A1 | * | 6/2006 | Aingaran et al. | 718/100 |

OTHER PUBLICATIONS

Balasubramonian et al., Dynamically Allocating Processor Resources between Nearby and Distant ILP, May 2001, pp. 1-6.*

(Continued)

*Primary Examiner*—Eddie P Chan
*Assistant Examiner*—George D Giroux
(74) *Attorney, Agent, or Firm*—Park, Vaughan, Fleming & Powler LLP

(57) ABSTRACT

A system that facilitates improving performance of a processor during scout mode. During a normal-execution mode, the system executes instructions for using main thread. Upon encountering a stall condition during execution of the main thread, the system generates a checkpoint. The system then enters a scout mode, wherein instructions are speculatively executed by a speculative thread to prefetch future memory references, but results are not committed to the architectural state of the processor. Upon encountering a memory reference during scout mode, the system issues a prefetch for the memory reference. If the stall condition that caused the processor to enter scout mode is resolved, the system uses the checkpoint to resume execution of the main thread from the instruction that caused the stall condition, and simultaneously continues executing instructions in scout mode using the speculative thread from the point where the speculative thread left off.

18 Claims, 5 Drawing Sheets

OTHER PUBLICATIONS

Lebeck et al., A Large, Fast Instruction Window for Tolerating Cache Misses, May 2002, pp. 59-69.*
Srinivasan et al., A Minimal Dual-Core Speculative Multi-Threading Architecture, Oct. 2004, pp. 1-2.*
Sohi et al., Speculative Multithreaded Processors, Apr. 2001, pp. 71-72.*
Mutlu et al., Runahead Execution: An Alternative to Very Large Instruction Windows for Out-of-order Processors, Feb. 2003, p. 1.*
Hirata et al., An Elementary Processor Architecture with Simultaneous Instruction Issuing from Multiple Threads, Apr. 1992, pp. 136-145.*

* cited by examiner

```
              ADD                      ADD                      ADD
PC 302 ─────→ LD         PC 302 ─────→ LD                       LD
PC 304 ─────→ ADD                      ADD         PC 302 ─────→ ADD
               .                        .                        .
               .                        .                        .
               .                        .                        .
              SUB                      SUB                      SUB
              LD                       LD                       LD
               .                        .                        .
               .                        .                        .
               .                        .                        .
              LD                       LD                       LD
               .                        .                        .
               .                        .                        .
               .                        .                        .
              SUB        PC 304 ─────→ SUB                      SUB
              LD                       LD                       LD
               .                        .                        .
               .                        .                        .
               .                        .                        .
              LD                       LD                       LD
```

FIG. 3A  FIG. 3B  FIG. 3C
(PRIOR ART)  (PRIOR ART)  (PRIOR ART)

```
              ADD                      ADD                      ADD
PC 402 ─────→ LD         PC 402 ─────→ LD                       LD
PC 404 ─────→ ADD                      ADD         PC 402 ─────→ ADD
               .                        .                        .
               .                        .                        .
               .                        .                        .
              SUB                      SUB                      SUB
              LD                       LD                       LD
               .                        .                        .
               .                        .                        .
               .                        .                        .
              LD                       LD                       LD
               .                        .                        .
               .                        .                        .
               .                        .                        .
              SUB        PC 404 ─────→ SUB                      SUB
              LD                       LD         PC 404 ─────→ LD
               .                        .                        .
               .                        .                        .
               .                        .                        .
              LD                       LD                       LD
```

FIG. 4A  FIG. 4B  FIG. 4C

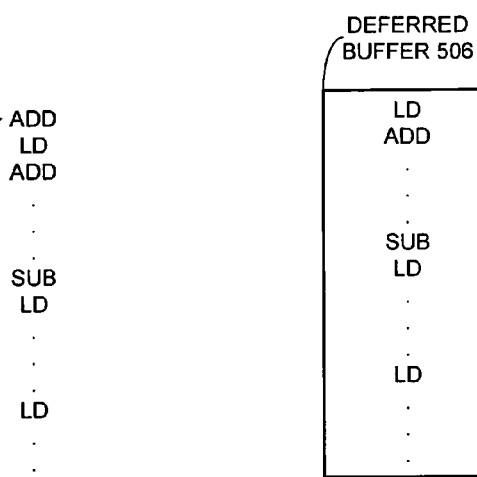
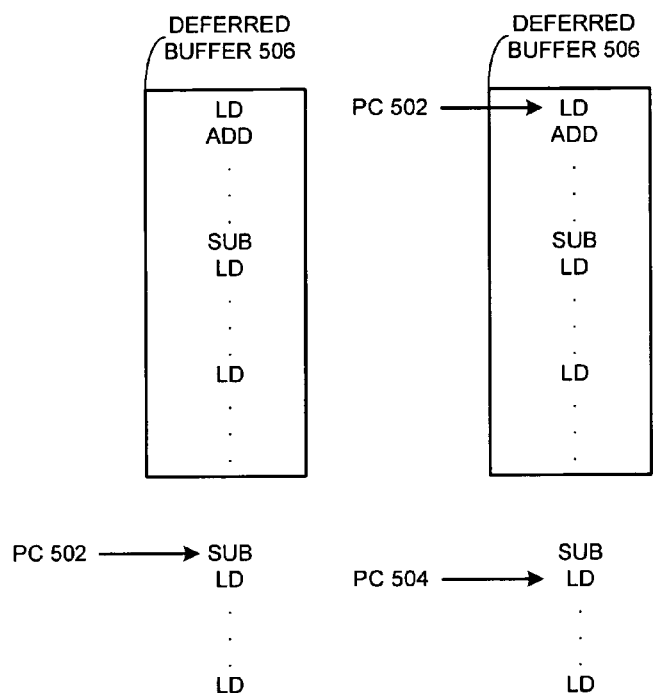
FIG. 5A  FIG. 5B  FIG. 5C

CONTINUING EXECUTION IN SCOUT MODE WHILE A MAIN THREAD RESUMES NORMAL EXECUTION

RELATED APPLICATION

This application is a continuation-in-part of a pending U.S. patent application, entitled "Selectively Deferring the Execution Of Instructions With Unresolved Data Dependencies As They Are Issued In Program Order," by inventors Shailender Chaudhry and Marc Tremblay, having Ser. No. 10/686,061 and a filing date of 14 Oct. 2003. This application hereby claims priority under 35 U.S.C. §120 to the above-listed patent application. Moreover, the above-listed application is hereby incorporated by reference.

BACKGROUND

1. Field of the Invention

The present invention relates to techniques for improving the performance of computer systems. More specifically, the present invention relates to a method and an apparatus for speeding up program execution by continuing to speculatively execute instructions in scout mode using a parallel speculative thread after a stall condition has cleared and the main thread resumes normal execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation, generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some designers have proposed entering a scout mode when a stall condition is encountered. During scout mode, the processor speculatively executes instructions to prefetch future loads, but the processor does not commit the results to the architectural state of the processor. For example, see U.S. patent application Ser. No. 10/741,944, entitled "Generating Prefetches by Speculatively Executing Code Through Hardware Scout Threading," by inventors Shailender Chaudhry and Marc Tremblay. This solution to the latency problem eliminates the complexity of the issue queue and the rename unit, and also achieves memory-level parallelism.

Note that after the stall condition is cleared, the processor leaves scout mode and returns to normal-execution mode. However, performance can be lost if the processor leaves scout mode just before executing an instruction which would have generated a useful prefetch. For example, suppose a processor executing in normal-execution mode encounters a stall condition which causes the processor to enter scout mode, wherein instructions are speculatively executed by a speculative thread to prefetch future loads, but results are not committed to the architectural state of the processor. At some time in the future, when the stall condition clears, the processor will return to normal-execution mode. If the processor is just about to generate a useful prefetch when it returns to normal-execution mode, the processor can potentially lose the opportunity to hide the memory latency for the useful prefetch because the processor returns to normal-execution mode instead of prefetching a cache line that it will eventually need.

Hence, what is needed is a method and an apparatus that facilitates prefetching cache lines during stall conditions without the above-described drawbacks of existing processor designs that support scout mode.

SUMMARY

One embodiment of the present invention provides a system that facilitates improving performance of a processor during scout mode. During a normal-execution mode, the system executes instructions using a main thread. Upon encountering a stall condition during execution of the main thread, the system generates a checkpoint. The system then enters a scout mode, wherein instructions are speculatively executed by a speculative thread to prefetch future memory references, but results are not committed to the architectural state of the processor. (Note that both the main thread and the speculative thread are associated with a single software thread.) Upon encountering a memory reference during scout mode, the system issues a prefetch for the memory reference. If the stall condition that caused the processor to enter scout mode is resolved, the system uses the checkpoint to resume execution of the main thread from the instruction that caused the stall condition, and simultaneously continues executing instructions in scout mode using the speculative thread from the point where the speculative thread left off.

In a variation on this embodiment, when the main thread encounters a second stall condition, the system generates a checkpoint and re-launches the speculative thread in scout mode from the instruction that caused the second stall condition.

In a variation on this embodiment, upon encountering an unresolved data dependency during execution of the main thread, the system generates a checkpoint. The system then executes subsequent instructions in an execute-ahead mode, wherein instructions that cannot be executed because of an unresolved data dependency are deferred, and wherein other non-deferred instructions are executed in program order. When the unresolved data dependency is resolved during execute-ahead mode, the system executes deferred instructions in a deferred-execution mode. The system also simultaneously executes instructions in scout mode using the speculative thread from the point where the execute-ahead mode left off. If all deferred instructions are eventually executed, the system returns to the normal-execution mode to resume normal program execution from the point where the execute-ahead mode left off.

In a variation on this embodiment, the system interleaves execution of instructions between the speculative thread and the main thread.

In a variation on this embodiment, the system maintains a first program counter for the main thread and a second program counter for the speculative thread.

In a variation on this embodiment, the system supports simultaneous multithreading or vertical multithreading.

BRIEF DESCRIPTION OF THE FIGURES

FIG. 3A presents a sequence of instructions in which the processor enters scout mode.

FIG. 3B presents a sequence of instructions in which the stall condition is cleared.

FIG. 3C presents a sequence of instructions in which the processor returns to normal-execution mode after the stall condition is cleared.

FIG. 4A presents a sequence of instructions in which the processor enters scout mode in accordance with an embodiment of the present invention.

FIG. 4B presents a sequence of instructions in which the stall condition is cleared in accordance with an embodiment of the present invention.

FIG. 4C presents a sequence of instructions in which the processor returns to normal-execution mode after the stall condition is cleared, but where the scout thread continues to execute instructions ahead of the main thread in accordance with an embodiment of the present invention.

FIG. 5A presents a sequence of instructions in which the processor enters execute-ahead mode while waiting for an unresolved data dependency to resolve in accordance with an embodiment of the present invention.

FIG. 5B presents a sequence of instructions in which the unresolved data dependency is resolved in accordance with an embodiment of the present invention.

FIG. 5C presents a sequence of instructions in which the processor enters deferred-execution mode after the unresolved data dependency is resolved, but where a scout thread speculatively executes instructions ahead of the deferred thread in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Processor

Figure 1A:
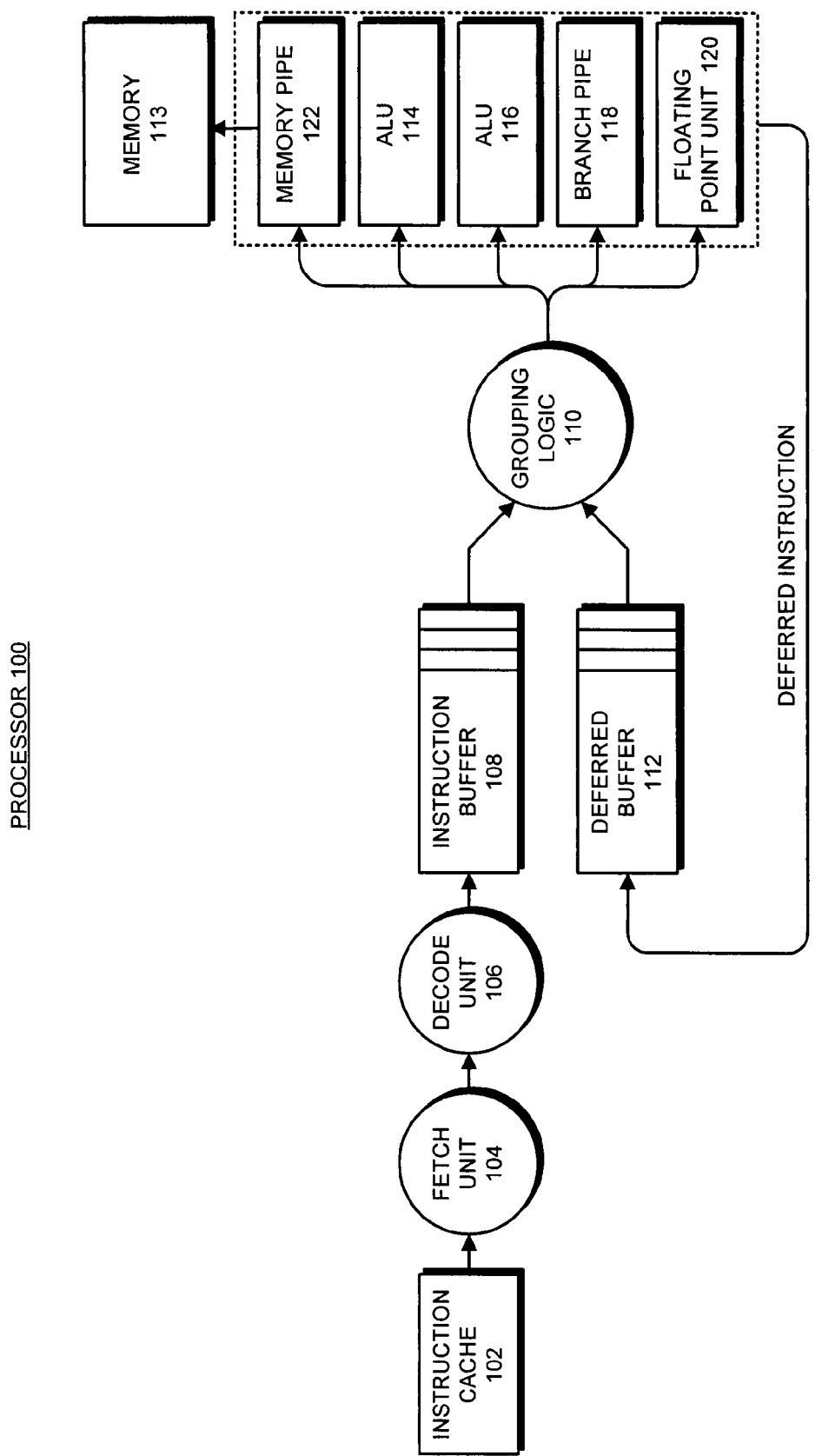
FIG. 1A illustrates a processor in accordance with an embodiment of the present invention.

FIG. 1A illustrates a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred buffer 112, grouping logic 110, memory 113, arithmetic logic unit (ALU) 114, ALU 116, branch pipe 118 and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred buffer 112. Note that like instruction buffer 108, deferred buffer 112 is also organized as a FIFO buffer.

When the data dependency is eventually resolved, instructions from deferred buffer 112 are executed in program order with respect to other deferred instructions, but not with respect to other previously executed non-deferred instructions. This process is described in more detail below with reference to FIG. 2.

In one embodiment of the present invention, the processor supports simultaneous multithreading or vertical multithreading.

Keeping Track of Dependencies

The present invention keeps track of data dependencies in order to determine if an instruction is subject to an unresolved data dependency. In one embodiment of the present invention, this can involve maintaining state information for each register, which indicates whether or not a value in the register depends on an unresolved data dependency.

Figure 1B:
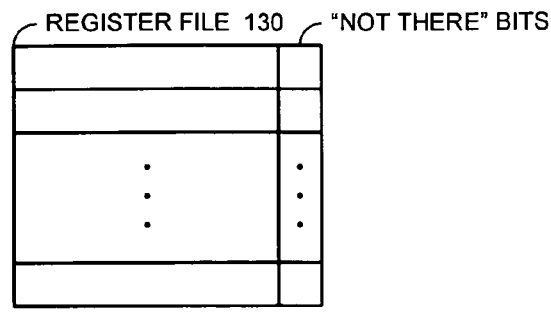
FIG. 1B illustrates a register file in accordance with an embodiment of the present invention.

For example, FIG. 1B illustrates a register file 130 in accordance with an embodiment of the present invention. Each register in register file 130 is associated with a "not-there" bit, which keeps track of whether a valid operand value is contained in the register, or if the operand cannot be produced because of an unresolved data dependency. For example, if the register is waiting for an operand to return from a load operation, the corresponding not-there bit is set to indicate that the desired operand value is not present in the register. When a subsequent instruction references a source operand value that is marked as not-there, and generates a result that is stored in a destination register, the system marks the destination register as not-there to indicate that the value in the destination register also depends on the unresolved data-dependency. This can be accomplished by marking the not-there bit of the destination register with the "OR" of the not-there bits for source registers of the instruction.

State Diagram

Figure 2:
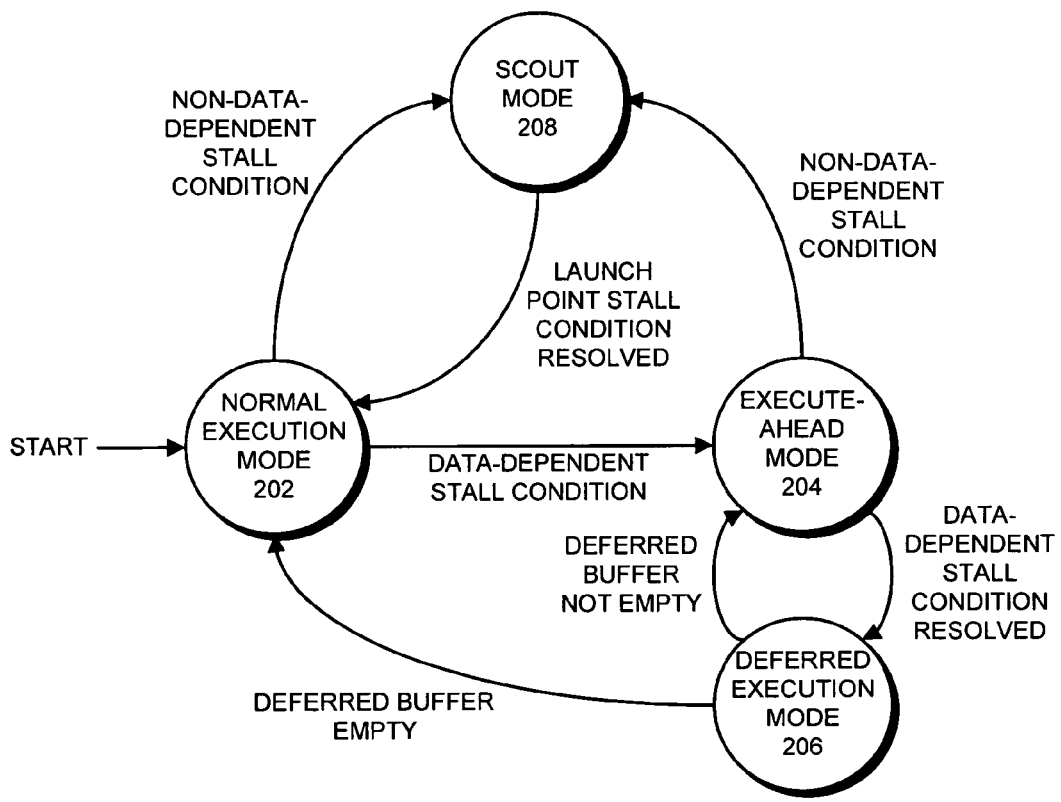
FIG. 2 presents a state diagram which includes the execute-ahead mode in accordance with an embodiment of the present invention.

FIG. 2 presents a state diagram which includes the execute-ahead mode in accordance with an embodiment of the present invention. The system starts in normal-execution mode 202, wherein instructions are executed in program order as they are issued from instruction buffer 108 (see FIG. 1).

Next, if an unresolved data dependency arises during execution of an instruction, the system moves to execute-ahead mode 204. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 204, the system performs a checkpointing operation to generate a checkpoint that can be used, if necessary, to return execution of the process to the point where the unresolved data dependency was encountered; this point is referred to as the "launch point." (Note that generating the checkpoint can involve saving the precise architectural state of the processor to facilitate subsequent recovery from exceptions that arise during execute-ahead mode or deferred mode.) The system also "defers" execution of the instruction that encountered the unresolved data dependency, and stores the deferred instruction in deferred buffer 112.

Within execute-ahead mode 204, the system continues to execute instructions in program order as they are received from instruction buffer 108, and any instructions that cannot execute because of an unresolved data dependency are stored in deferred buffer 112.

When the system is in execute-ahead mode 204, if an unresolved data dependency is finally resolved, the system moves into deferred execution mode 206, wherein instructions are executed in program order from deferred buffer 112. During deferred execution mode 206, the system attempts to execute deferred instructions from deferred buffer 112. Note that the system attempts to execute these instructions in program order with respect to other deferred instructions in deferred buffer 112, but not with respect to other previously executed non-deferred instructions (and not with respect to deferred instructions executed in previous passes through deferred buffer 112). During this process, the system defers execution of deferred instructions that still cannot be executed because of unresolved data dependencies and places these again-deferred instruction back into deferred buffer 112. The system executes the other instruction that can be executed in program order with respect to each other.

After the system completes a pass through deferred buffer 112, if deferred buffer 112 is empty, the system moves back into normal-execution mode 202. This may involve committing changes made during execute-ahead mode 204 and deferred execution mode 206 to the architectural state of the processor, if such changes have not been already committed. It can also involve throwing away the checkpoint generated when the system moved into execute-ahead mode 204.

On the other hand, if deferred buffer 112 is not empty after the system completes a pass through deferred buffer 112, the system returns to execute ahead mode to execute instructions from instruction buffer 108 from the point where the execute-ahead mode 204 left off.

If a non-data dependent stall condition arises while the system is in normal-execution mode 202 or in execute-ahead mode 204, the system moves into scout mode 208. (This non-data-dependent stall condition can include: a memory barrier operation; a load buffer full condition; a store buffer full condition, or a deferred buffer full condition.) In scout mode 208, instructions are speculatively executed to prefetch future loads, but results are not committed to the architectural state of the processor.

Scout mode is described in more detail in U.S. patent application Ser. No. 10/741,944, entitled "Generating Prefetches by Speculatively Executing Code Through Hardware Scout Threading," by inventors Shailender Chaudhry and Marc Tremblay (filed 19 Dec. 2003). This patent application is hereby incorporated by reference herein to provide details on how scout mode operates.

Unfortunately, computational operations performed during scout-ahead mode need to be recomputed again, which can require a large amount of computational work.

When the original "launch point" stall condition is finally resolved, the system moves back into normal-execution mode 202, and, in doing so, uses the previously generated checkpoint to resume execution from the launch point instruction (the instruction that initially encountered the stall condition).

Note that the launch point stall condition is the stall condition that originally caused the system to move out of normal-execution mode 202. For example, the launch point stall condition can be the data-dependent stall condition that caused the system to move from normal-execution mode 202 to execute-ahead mode 204, before moving to scout mode 208. Alternatively, the launch point stall condition can be the non-data-dependent stall condition that caused the system to move directly from normal-execution mode 202 to scout mode 208.

Normal-Execution Mode and Scout Mode

Figure 6:
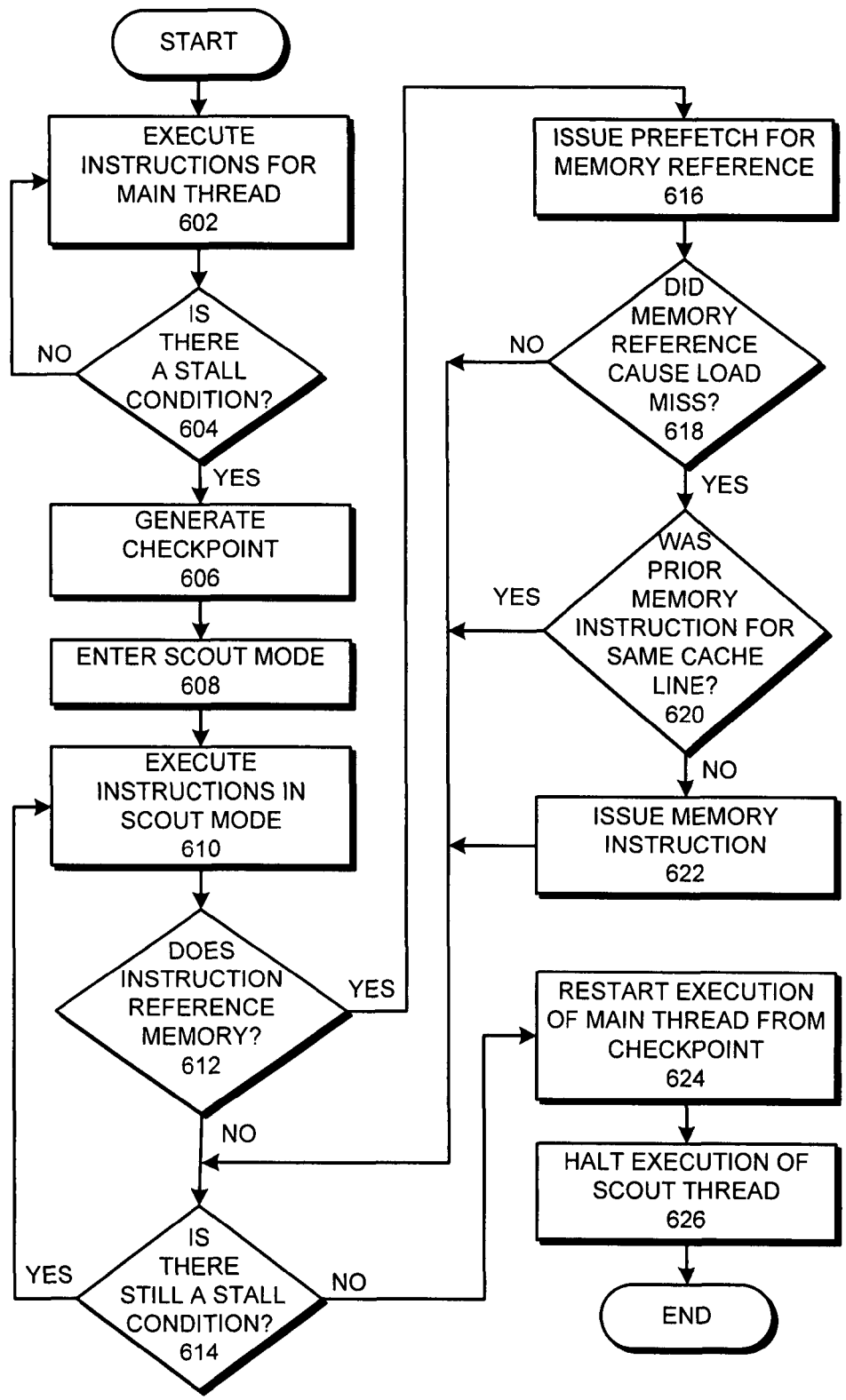
FIG. 6 presents a flow chart illustrating the process of handling a stall condition.

FIG. 6 presents a flow chart illustrating the process of handling a stall condition by entering scout mode. The process starts when the processor executes instructions for the main thread in normal-execution mode (step 602). During instruction execution in normal-execution mode, the processor determines if there is a stall condition (step 604). If there is no stall condition, the processor returns to step 602 and continues to execute instructions for the main thread. Otherwise, if there is a stall condition, the processor generates a checkpoint (step 606) and enters scout mode (step 608). The processor then executes instructions in scout mode (step 610) and determines if the instruction references memory (step 612). If not, the processor determines if there is still a stall condition (step 614). If so, the processor returns to step 610 and continues to execute instructions in scout mode.

In step 612, if the present instruction references memory, the processor issues a prefetch for the memory reference (step 616). The processor then determines if the memory reference causes a load miss (step 618). If not, the processor returns to step 614 and determines if there is still a stall condition. Otherwise, the processor determines if the prior memory reference targets the same cache line as the current memory reference (step 620). If so, the processor returns to step 614 and determines if there is still a stall condition. Otherwise, the processor issues the memory instruction (step 622) and the processor returns to step 614 to determine if there is still a stall condition. If there is no longer a stall condition at step 614, the processor restarts execution of the main thread from the checkpoint (step 624) and the processor halts execution of the scout thread (step 626).

Note that after the processor halts execution of the scout thread, the processor returns to normal-execution mode at step 602. Unfortunately, by returning to normal-execution mode, the system may miss an opportunity to perform a prefetch that could potentially improve performance.

For example, FIG. 3A presents a sequence of instructions in which the processor enters scout mode. It illustrates program counters (PCs) 302 and 304. PC 302 is the program counter for the main thread and PC 304 is the program counter for the speculative thread (i.e. the scout thread). In this exemplary instruction stream, the LD instruction produces a cache miss and hence a stall condition. At this point, the processor uses PC 304 to enter scout mode to speculatively execute instructions to prefetch future loads.

After speculatively executing instructions in scout mode using PC 304, the stall condition clears. In this example, the stall condition clears when PC 304 reaches the SUB instruction (see FIG. 3B).

After the stall condition is cleared, the processor uses PC 302 to return to normal-execution mode (see FIG. 3C). At this point, the processor terminates the scout thread. In other words, the processor stops using PC 304 to speculatively execute instructions to prefetch future loads.

After the stall condition clears and after the prefetch operation returns the cache line for the future load, the processor returns to normal-execution mode. However, the processor loses an opportunity to prefetch cache lines for a future load instruction past the point where the scout thread stopped. For instance, if the LD instruction after the SUB instruction, pointed to by PC 304 in FIG. 3B, ultimately produces another load miss, the processor will have to re-enter scout mode when it encounters this load miss. Hence, in this example, the processor loses an opportunity to hide the memory latency of this load miss because it re-executes the instructions prior to the load miss instead of prefetching a cache line for the load miss.

Normal-Execution Mode Plus Scout Mode

FIG. 4A presents a sequence of instructions in which the processor enters scout mode in accordance with an embodiment of the present invention. It contains PCs 402 and 404. PC 402 is the program counter for the main thread and PC 404 is the program counter for the speculative thread (i.e. the scout thread). In this exemplary instruction stream, the LD instruction produces a cache miss which gives rise to a stall condition. At this point, the processor uses PC 404 to enter scout mode to speculatively execute instructions to prefetch future loads.

After speculatively executing instructions in scout mode using PC 404, the stall condition clears (see FIG. 4B). In this example, the stall condition clears when PC 404 reaches the SUB instruction.

After the stall condition clears, the processor uses PC 402 to return to normal-execution mode (see FIG. 4C). Unlike the processor in FIG. 3C, the processor in FIG. 4C uses PC 404 to continue speculatively executing instructions to prefetch future loads using the speculative thread while re-executing instruction in normal-execution mode using the main thread. Therefore, the processor hides memory latency for a future memory reference by simultaneously prefetching a cache line for the future memory reference while it is re-executing instructions in normal-execution mode.

Note that the present invention improves upon the process illustrated in FIG. 6. Instead of halting execution of the scout thread at step 626, the present invention continues to execute instructions in scout mode using the scout thread from the point where the scout thread left off, while simultaneously executing instructions from the checkpoint using the main thread.

Note that the system interleaves execution of instructions between the speculative thread and the main thread. In one embodiment of the present invention, the processor uses a round-robin thread scheduling scheme to interleave instructions between the speculative thread and the main thread.

In one embodiment of the present invention, if the processor encounters a second stall condition while both the main thread and the speculative thread are executing, the processor generates a checkpoint and re-launches the speculative thread in scout mode from the instruction that caused the second stall condition; the main thread is terminated.

Deferred-Execution Mode Plus Scout Mode

FIG. 5A presents a sequence of instructions in which the processor enters execute-ahead mode while waiting for an unresolved data dependency to resolve in accordance with an embodiment of the present invention. In this exemplary instruction stream, the LD instruction produces a cache miss and hence an unresolved data dependency. At this point, the processor enters execute-ahead mode to execute instructions which do not depend on the unresolved data dependency.

The processor uses PC 502, which is the program counter for the main thread, to execute instructions in execute-ahead mode. The processor also places instructions which depend on the unresolved data dependency into deferred buffer 506 (see FIG. 5B). In this example, when PC 502 reaches the SUB instruction, the unresolved data dependency is resolved.

At this point, the processor leaves execute-ahead mode and enters deferred-execution mode where it uses PC 502 to execute instructions in deferred buffer 506 (see FIG. 5C). The processor then uses PC 504 to speculatively execute instructions to prefetch future loads. Hence, in this example, the processor hides memory latency for a future memory reference by prefetching a cache line for the future memory reference while executing instructions in the deferred buffer.

Note that if all deferred instructions are eventually executed, the processor returns to the normal-execution mode to resume normal program execution from the point where the execute-ahead mode left off.

Note that there are two sources for the instructions when the system concurrently executes the scout thread and the deferred thread: (1) the instruction cache and (2) the deferred buffer. Hence, the scout thread executes instructions from the instruction cache while the deferred thread executes instructions from the deferred buffer.

Note that the instructions in the deferred buffer are dependent on unresolved data dependencies, and these dependent instructions tend to cause pipeline bubbles when they are executed. Hence, if the processor only executes instructions from the deferred queue, clock cycles are wasted waiting for the pipeline bubbles. However, since the system interleaves execution of instructions between the scout thread and the deferred thread, the processor can execute instructions for the scout thread during the cycles when the deferred thread would otherwise be waiting for bubbles into the execution pipeline.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for improving performance of a processor, comprising:

executing instructions for a main thread;

upon encountering a non-data dependent stall condition during execution of the main thread, wherein the non-data dependent stall condition includes a deferred buffer full condition, generating a checkpoint, which includes an architectural state of the processor, entering scout mode, wherein instructions are speculatively executed by a speculative thread to prefetch future memory references, but results are not committed to the architectural state of the processor, wherein both the main thread and the speculative thread are associated with a single software thread, and upon encountering a memory reference during scout mode, issuing a prefetch for the memory reference; and wherein if the stall condition that caused the processor to enter scout mode is resolved, the method further comprises, using the checkpoint to resume execution of the main thread from the instruction that caused the stall condition, wherein the processor reexecutes instructions executed during scout mode, and wherein results of the instructions executed during scout mode are not reused, and simultaneously continuing execution of instructions in scout mode using the speculative thread from the point where the speculative thread left off while the processor executes instructions in the main thread.

2. The method of claim 1, wherein when the main thread encounters a second stall condition, the method further comprises:

generating a checkpoint; and re-launching the speculative thread in scout mode from the instruction that caused the second stall condition.

3. The method of claim 1, wherein upon encountering an unresolved data dependency during execution of the main thread, the method further comprises:

generating a checkpoint; and executing subsequent instructions in an execute-ahead mode, wherein instructions that cannot be executed because of an unresolved data dependency are deferred, and wherein other non-deferred instructions are executed in program order; and when the unresolved data dependency is resolved during execute-ahead mode, the method further comprises:

executing deferred instructions in a deferred-execution mode;

simultaneously executing instructions in scout mode using the speculative thread from the point where the execute-ahead mode left off; and if all deferred instructions are executed, returning to the normal-execution mode to resume normal program execution from the point where the execute-ahead mode left off.

4. The method of claim 1, further comprising interleaving execution of instructions between the speculative thread and the main thread.

5. The method of claim 1, wherein the processor maintains a first program counter for the main thread and a second program counter for the speculative thread.

6. The method of claim 1, wherein the processor supports simultaneous multithreading or vertical multithreading.

7. An apparatus for improving performance of a processor, comprising:

a processor which is configured to:

execute instructions for a main thread;

upon encountering a non-data dependent stall condition during execution of the main thread, wherein the non-data dependent stall condition includes a deferred buffer full condition, to generate a checkpoint, which includes an architectural state of the processor, enter scout mode, wherein instructions are speculatively executed by a speculative thread to prefetch future memory references, but results are not committed to the architectural state of the processor, wherein both the main thread and the speculative thread are associated with a single software thread, and upon encountering a memory reference during scout mode, to issue a prefetch for the memory reference; and wherein if the stall condition that caused the processor to enter scout mode is resolved, the processor is configured to, use the checkpoint to resume execution of the main thread from the instruction that caused the stall condition, wherein the processor reexecutes instructions executed during scout mode, and wherein results of the instructions executed during scout mode are not reused, and to simultaneously continue execution of instructions in scout mode using the speculative thread from the point where the speculative thread left off while the processor executes instructions in the main thread.

8. The apparatus of claim 7, wherein when the main thread encounters a second stall condition, the processor is configured to:

generate a checkpoint; and to re-launch the speculative thread in scout mode from the instruction that caused the second stall condition.

9. The apparatus of claim 7, wherein upon encountering an unresolved data dependency during execution of the main thread, the processor is configured to:

generate a checkpoint, and to execute subsequent instructions in an execute-ahead mode, wherein instructions that cannot be executed because of an unresolved data dependency are deferred, and wherein other non-deferred instructions are executed in program order, and when the unresolved data dependency is resolved during execute-ahead mode, the processor is configured to, execute deferred instructions in a deferred-execution mode, simultaneously execute instructions in scout mode using the speculative thread from the point where the execute-ahead mode left off, and if all deferred instructions are executed, to return to the normal-execution mode to resume normal program execution from the point where the execute-ahead mode left off.

10. The apparatus of claim 7, wherein the processor is configured to interleave execution of instructions between the speculative thread and the main thread.

11. The apparatus of claim 7, wherein the processor is configured to maintain a first program counter for the main thread and a second program counter for the speculative thread.

12. The apparatus of claim 7, wherein the processor is configured to support simultaneous multithreading or vertical multithreading.

13. A computer system for improving performance of a processor, comprising:

a processor which is configured to, execute instructions for a main thread;

upon encountering a non-data dependent stall condition during execution of the main thread, wherein the non-data dependent stall condition includes a deferred buffer full condition, to generate a checkpoint, which includes an architectural state of the processor, enter scout mode, wherein instructions are speculatively executed by a speculative thread to prefetch future memory references, but results are not committed to the architectural state of the processor, wherein both the main thread and the speculative thread are associated with a single software thread, and upon encountering a memory reference during scout mode, to issue a prefetch for the memory reference, and wherein if the stall condition that caused the processor to enter scout mode is resolved, the processor is configured to:

use the checkpoint to resume execution of the main thread from the instruction that caused the stall condition, wherein the processor reexecutes instructions executed during scout mode, and wherein results of the instructions executed during scout mode are not reused, and to simultaneously continue execution of instructions in scout mode using the speculative thread from the point where the speculative thread left off while the processor executes instructions in the main thread.

14. The computer system of claim 13, wherein when the main thread encounters a second stall condition, the processor is configured to:

generate a checkpoint; and to re-launch the speculative thread in scout mode from the instruction that caused the second stall condition.

15. The computer system of claim 13, wherein upon encountering an unresolved data dependency during execution of the main thread, the processor is configured to:

generate a checkpoint; and to execute subsequent instructions in an execute-ahead mode, wherein instructions that cannot be executed because of an unresolved data dependency are deferred, and wherein other non-deferred instructions are executed in program order, and when the unresolved data dependency is resolved during execute-ahead mode, the processor is configured to, execute deferred instructions in a deferred-execution mode, simultaneously execute instructions in scout mode using the speculative thread from the point where the execute-ahead mode left off, and if all deferred instructions are executed, to return to the normal-execution mode to resume normal program execution from the point where the execute-ahead mode left off.

16. The computer system of claim 13, wherein the processor is configured to interleave execution of instructions between the speculative thread and the main thread.

17. The computer system of claim 13, wherein the processor is configured to maintain a first program counter for the main thread and a second program counter for the speculative thread.

18. The computer system of claim 13, wherein the processor is configured to support simultaneous multithreading or vertical multithreading.

* * * * *